United States Patent [19]

Ling et al.

[11] Patent Number: 4,600,967
[45] Date of Patent: Jul. 15, 1986

[54] CERAMIC COMPOSITIONS AND DEVICES

[75] Inventors: Hung C. Ling, West Windsor Township, Mercer County; Man F. Yan, Berkeley Heights, both of N.J.

[73] Assignees: AT&T Technologies, Inc., Berkeley Heights; Bell Telephone Laboratories, Inc., Murray Hill, both of N.J.

[21] Appl. No.: 788,527

[22] Filed: Oct. 21, 1985

Related U.S. Application Data

[63] Continuation of Ser. No. 642,327, Aug. 20, 1984, abandoned.

[51] Int. Cl.$^4$ .......................... H01G 4/10; C04B 35/00
[52] U.S. Cl. ...................................... 361/321; 501/134
[58] Field of Search .................. 361/314, 315, 321; 501/134, 136

[56] References Cited

U.S. PATENT DOCUMENTS

| | | | |
|---|---|---|---|
| 3,600,652 | 4/1971 | Riley | 361/321 |
| 4,339,544 | 7/1982 | Sakabe et al. | 501/136 |
| 4,379,319 | 4/1983 | Wilson | 361/321 |
| 4,482,935 | 11/1984 | Wheeler | 361/321 |
| 4,485,180 | 11/1984 | Konoike et al. | 361/321 X |

Primary Examiner—Donald A. Griffin
Attorney, Agent, or Firm—J. F. Spivak

[57] ABSTRACT

A ceramic capacitor with high Q factor and small temperature coefficients is made using a sintered dielectric comprising

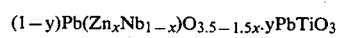

$$(1-y)Pb(Zn_xNb_{1-x})O_{3.5-1.5x} \cdot yPbTiO_3$$

wherein x is from 0.3 to 0.4 and y is from 0 to less than 0.1.

15 Claims, 7 Drawing Figures

CERAMIC COMPOSITIONS AND DEVICES

This is a continuation of application Ser. No. 642,327, filed 8/20/84 and now abandoned.

TECHNICAL FIELD

This invention relates to a ceramic dielectric composition having a low dissipation factor and a small temperature coefficient and to ceramic capacitors made therefrom.

BACKGROUND OF THE INVENTION

The electronics field, and particularly the electronic component field, is constantly seeking to improve devices such as capacitors employed in electronic circuits.

There is a particular need for dielectric materials for use in capacitors which exhibit low dissipation factors (or high Q values) at the operating frequencies and have a low temperature coefficient which preferably can be altered depending upon composition to give you a negative, positive or zero temperature coefficient (NPO materials). It is preferred that these materials have as high a dielectric constant as possible in a temperature range of from $-55°$ C. to $125°$ C. However, as Q increases, generally, the dielectric constant decreases such that the attainment of high dielectric constants and high Q has been mutually unattainable. Typical presently available ceramic compositions which have Q values up to about 1,000 at 1 MHz exhibit dielectric constants of only about 20 and temperature coefficients of $[\pm 0 \text{ to } 1000] \times 10^{-6}/°C$.

It is therefore desirable to develop a dielectric material having values of Q of at least 500 at 1 MHz while attaining dielectric constants of at least 100 at typical operating temperatures.

Of further interest for the commercial manufacture of such dielectric materials, is that the material be sinterable at temperatures of preferably less than $1,000°$ C. This reduction in sintering temperature not only saves cost in the sintering operation, but also allows less expensive electrodes to be applied to the ceramic material, particularly when employed in a multilayer ceramic capacitor having electrodes between layers which are incorporated prior to sintering.

Dielectric materials based upon lead niobate and including compositions having lead zinc niobate or other substituted lead niobates have been reported. For example reference can be made to U.S. Pat. Nos. 3,600,652; 4,339,544 and 4,379,319. However, the compositions reported in these patents differ from the subject compositions and capacitors made therefrom have substantially different properties.

SUMMARY OF THE INVENTION

This invention concerns a dielectric material having a Q of at least 500 at 1 MHz and a dielectric constant of from 100 to 150 at temperatures of from $-55°$ C. to $125°$ C. The novel dielectric material is a sintered material having a pyrochlore structure and may be represented by the formula $(1-y)Pb(Zn_xNb_{1-x})O_{3.5-1.5x} \cdot yPbTiO_3$ wherein x is from 0.3 to 0.4 and y is from 0 to less than 0.1.

The invention further includes ceramic capacitors made from the aforementioned dielectric material by placing such material between a pair of electrodes. The capacitors can be monolayer or multilayer in structure.

DETAILED DESCRIPTION

The novel ceramic compositions disclosed herein have a pyrochlore structure and may be represented by the formula

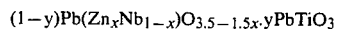

$$(1-y)Pb(Zn_xNb_{1-x})O_{3.5-1.5x} \cdot yPbTiO_3$$

wherein x is from 0.3 to 0.4 and y is from 0 to less than 0.1. These compositions may be formed from the oxides of the various metal constituents and $PbTiO_3$.

Typically, the oxides of the various constituents, e.g., PbO, ZnO and $Nb_2O_5$, are mixed on the basis of one mole of PbO together with the desired number of moles of each of the other oxides. These oxides are ball milled for 16 hours in deionized water. The milled mixtures are then filtered, dried and granulated. Thereafter, the dried mixture is calcined in air at $800°$ C. for four hours in covered platinum crucibles. After calcining, the powder is again ball milled to remove agglomeration. Appropriate portions of the calcined powder are then pressed into a disc at about 10,000 psi and sintered in oxygen for about two hours at the desired sintering temperature. As will hereinafter be shown, the preferred sintering temperature is about $980°$ C. $\pm 20°$ C. Electrical contacts are then formed on the sintered ceramic. Such contacts can be formed, for example, by ultrasonically applying indium electrodes on the two flat surfaces of the discs. The dielectric constant and dissipation factor of the various samples were measured by standard techniques and instruments at frequencies between 1 KHz and 10 MHz. The compositions which include $PbTiO_3$ are made in the same manner except that $PbTiO_3$ is added to the initial powders being ball milled.

Figure 1:
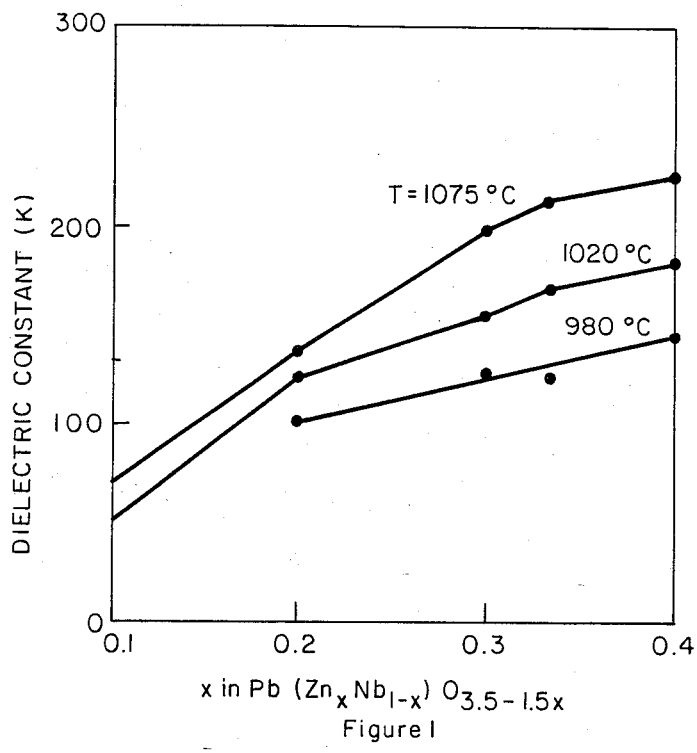
FIG. 1 is a graph showing the variation of the dielectric constant, K, as a function of the Zn concentration, x, at the sintering temperatures of $980°$ C., $1,020°$ C. and $1,075°$ C.

Referring to the figures, FIG. 1 shows the dielectric constant of samples prepared as indicated above as a function of x at various sintering temperatures. These samples contained no lead titanate. As can be seen from the graph, dielectric constants of from 100 to about 200 at room temperature were attained where x was between 0.2 and 0.4. Further, dielectric constants were somewhat higher for the materials sintered at the higher temperatures.

Figure 2:
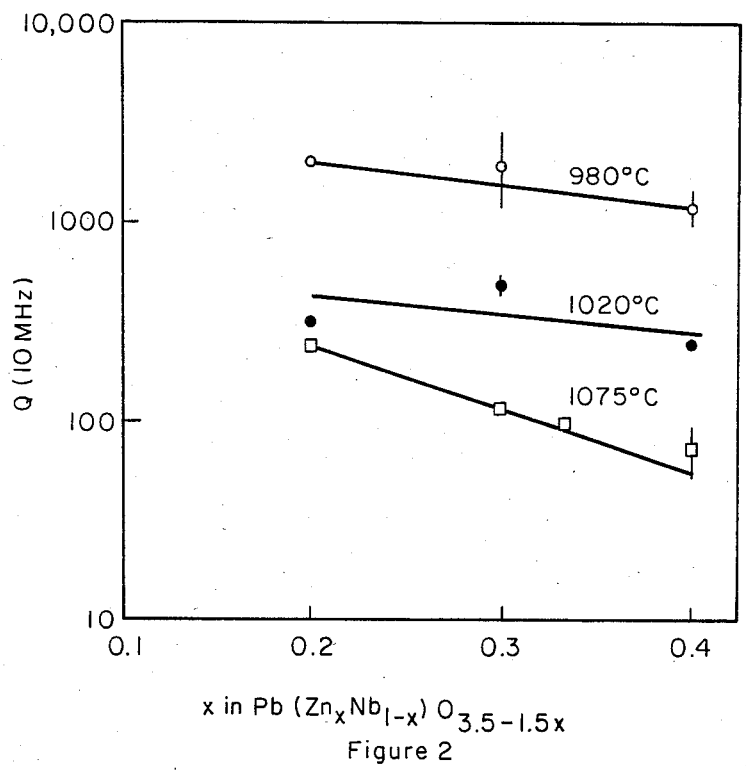
FIG. 2 is a graph showing the Q factor at 10 MHz versus the Zn concentration, x, at the sintering temperatures of $980°$ C., $1,020°$ C. and $1,075°$ C.

FIG. 2 shows the Q factor which is equal to 1/tan δ where tan δ is the dissipation factor, plotted as a function of x at three sintering temperatures. The Q factor was determined at 10 MHz. As can be seen from this graph, Q factors at 10 MHz in excess of 1,000 were attainable only at the 980° C. sintering temperature while sintering temperatures of 1,020° C. gave Q factors in the range of about 500. Also, at these two sintering temperatures, the Q factors varied only slightly with the mole fraction of zinc and niobium in the formulation. In comparison, the value of the Q factor varied substantially more at the sintering temperature of 1,075° C., and further, the Q factors at this higher sintering temperature were substantially lower than that attained at the lower sintering temperatures shown. It may be noted that this data also shows the results of compositions wherein y=0, i.e., no lead titanate was included in the formulation. Generally, in order to maximize the Q factor, sintering temperatures of 980° C.±20° C. are preferred.

If one compares the results of FIG. 1 to FIG. 2, one can see that the trend of high Q and high dielectric constant are opposite one another, and for practical devices, one must compromise one parameter in order to achieve the desired results in another parameter. Consequently, in order to achieve a Q factor of at least 500 at 1 MHz or 1,000 at 10 MHz, compositions wherein x=0.3 to 0.4 and sintered at 980° C.±20° C. are preferred. As will be shown, this composition range has other advantages, e.g., fairly constant and reproducible dielectric constants.

Figure 3:
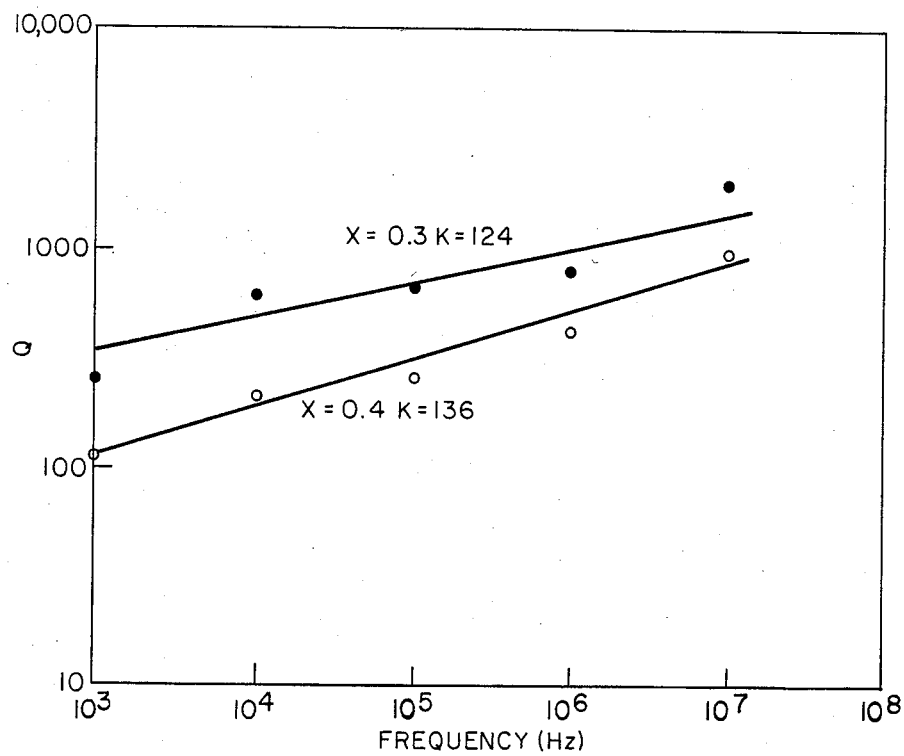
FIG. 3 is a graph showing the variation of the Q factor as a function of frequency for the $x=0.3$ and 0.4 compositions sintered at $980°$ C.

FIG. 3 shows the variation of Q factor with frequency for two compositions, namely, wherein x=0.3 and 0.4 and y=0. The value of K for the composition wherein x=0.3 is 124 and the value of K for the composition wherein x=0.4 is 136. It can be seen from this graph that the Q factor increases with increasing frequency for both compositions and that the composition value where x=0.3 gives a higher Q factor than where x=0.4. Both compositions had been sintered at 980° C. for two hours.

Figure 4:
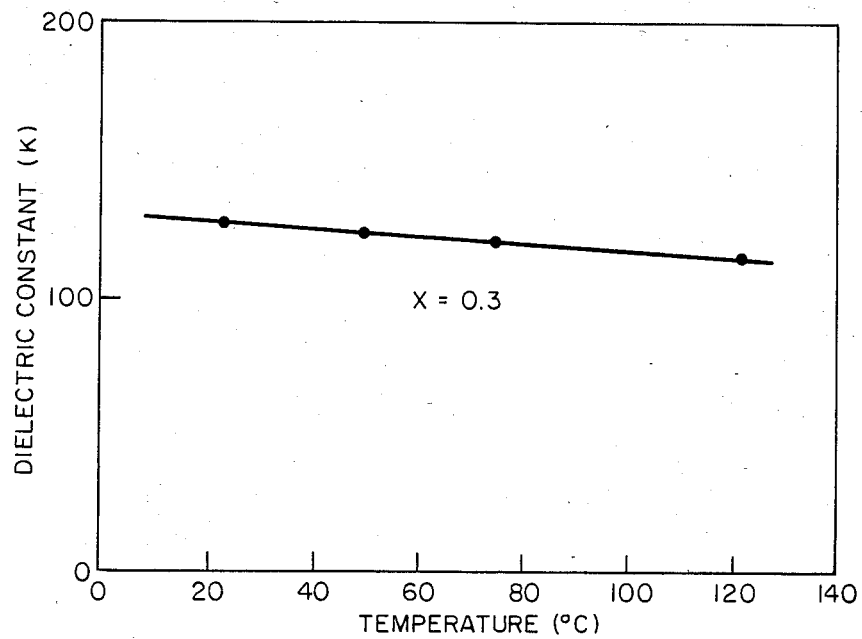
FIG. 4 is a graph showing the temperature dependence of the dielectric constant at 1 KHz for the $x=0.3$ composition sintered at $980°$ C.

FIG. 4 shows the dielectric constant measured as a function of the ambient temperature for a composition wherein x=0.3 and y=0 which was sintered at 980° C. for two hours. The temperature constant for this material was determined to be $-0.75 \times 10^{-3}/°C$. It can be seen that over the measured range there was only a small change in dielectric constant with the change in ambient temperature.

Figure 5:
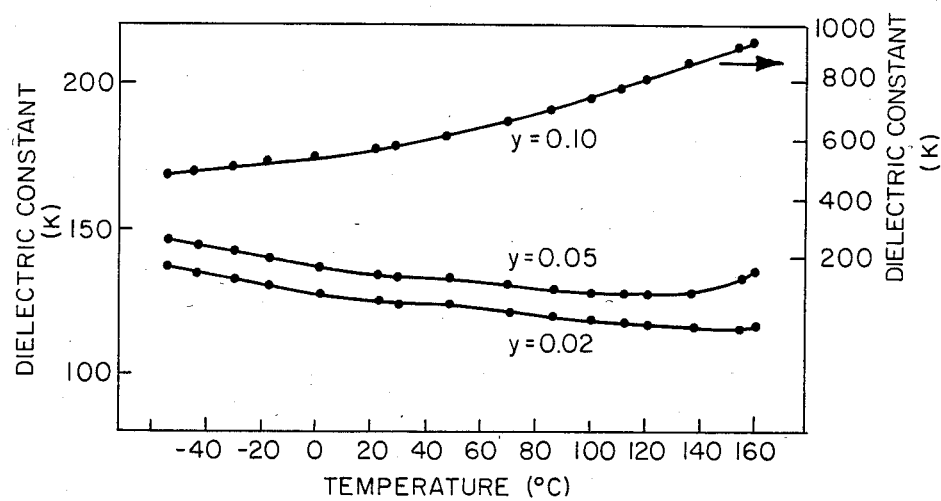
FIG. 5 is a graph showing the temperature dependence of the dielectric constant in the $(1-y)Pb(Zn_{\frac{1}{3}}Nb_{\frac{2}{3}})O_3 \cdot yPbTiO_3$ compositions sintered at $980°$ C.

FIG. 5 shows the dielectric constant of various compositions wherein x is equal to 0.33 and y is 0.10, 0.05 and 0.02, respectively. The dielectric constant was measured at temperatures from $-55°$ to $+160°$ C. As can be seen from the graph, the dielectric constant of the material when y is equal to 0.10 is substantially greater than the materials when y is between 0.02 and 0.05. However, it varies substantially with the temperature as compared to the compositions with lesser amounts of lead titanate and was found to have a much lower Q factor. The dielectric constants of the materials wherein y is between 0.02 and 0.05 remains in the same range as materials without lead titanate added thereto, and displays a slightly smaller negative temperature dependence than the compositions containing the same amount of zinc and niobium but without any lead titanate added. More specifically, the y=0.02 composition has a TC equal to $-0.66 \times 10^{-3}/°C$. between $-55°$ to 125° C. When the lead titanate content is increased to 0.05, the negative TC becomes still smaller and is equal to $-0.54 \times 10^{-3}/°C$. between $-55°$ to 125° C. A positive temperature dependence begins to set in at temperatures above about 140° C.

Figure 6:
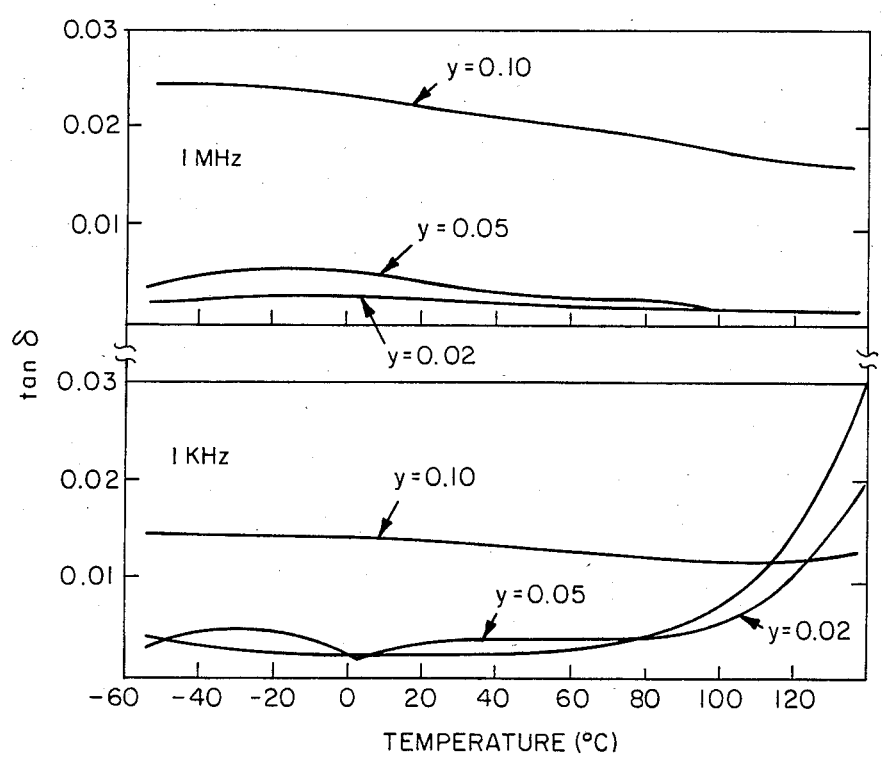
FIG. 6 is a graph showing the temperature dependence of tan $\delta(=1/Q)$ in the compositions as set forth with reference to FIG. 5 at both 1 KHz and 1 MHz.

FIG. 6 is a graph showing the dissipation factor, tan δ, as a function of temperature from about $-55°$ C. to 140° C. at both 1 KHz and 1 MHz for compositions wherein x is equal to 0.33 and y equals 0.02, 0.05 and 0.10, respectively. As can be seen from the graph, the dissipation factor is substantially higher for the y equals 0.10 composition as compared to the other compositions over the whole temperature range at 1 MHz and over most of the temperature range at 1 KHz.

It is important to note that the novel compositions absent the lead titanate have a pyrochlore structure as opposed to the perovskite structure. It has been found that these particular ceramic compositions form the pyrochlore structure as the only stable phase when sintered at temperatures in excess of 800° C. However, as one adds lead titanate, the perovskite structure tends to appear with rapidly increasing intensities of perovskite X-ray diffraction peaks as the mole fraction of lead titanate increased above about 0.05 mole. While lead titanate itself has the perovskite structure, there is some evidence that at mole fractions above 0.05 in the lead-zinc niobate, that some of the latter material is transformed into the perovskite phase due to the presence of Ti ions. The perovskite structure, while giving higher dielectric constants, results in substantially higher dissipation factors and hence lower values of Q than desirable. Also, the temperature dependence of the compositions having a significant quantity of perovskite phase therein is greater than the materials which are all pyrochlore. Hence, PbTiO₃ addition is preferably limited to 0.05 moles per mole of lead. However, for certain applications up to 0.1 mole PbTiO₃ can be tolerated.

When comparing X-ray peaks of the compositions wherein x is equal to 0.1 versus x equals 0.33, it is found that eight extra peaks occur in the composition of x=0.33 with a gradual change in development of the peaks as x is increased from 0.1 to 0.33. Remarkably, however, the composition with x=0.4 shows the same diffraction pattern as when x is equal to 0.33. This suggests that the pyrochlore structure remains even though the number of oxygen ions is less than the number (3.0) generally required for the stability of the oxygen octahedron in the pyrochlore structure. As previously shown, the dielectric constant measured at 1 KHz and at room temperature as a function of the composition indicates the dielectric constant, K, increases monotomically with increasing Zn concentration and sintering temperature, with a maximum value of about 225 at x=0.4. Since, for most device applications it is desirable to obtain a Q of at least 1,000 at 10 MHz while maintaining a reasonable value of the dielectric constant, it has been found to be preferred to use a composition wherein x is between 0.3 and 0.4 which has been sintered at a temperature of about 980° C.±20° C. Such compositions will also have a Q of at least 500 at 1 MHz.

The addition of lead titanate to the lead zinc niobate compositions is primarily to adjust the temperature dependence of the dielectric constant. As previously indicated, when y=0, i.e., no lead titanate added, a temperature coefficient of $-0.75 \times 10^{-3}/°C$. between $-55°$ and 125° C. is observed when x is less than or equal to 0.33 and $-0.55 \times 10^{-3}/°C$. when x is equal to 0.4. These temperature coefficients can be adjusted to be closer to zero by adding the lead titanate to the ceramic composition in quantities of up to 0.1 mole fraction of lead titanate. Additions beyond this point tend to lead to the formation of a substantial amount of the perovskite phase and are hence preferably avoided. Also, the Q and K values are fairly well preserved when incorporating up to 0.05 mole fraction of lead titanate.

Figure 7:
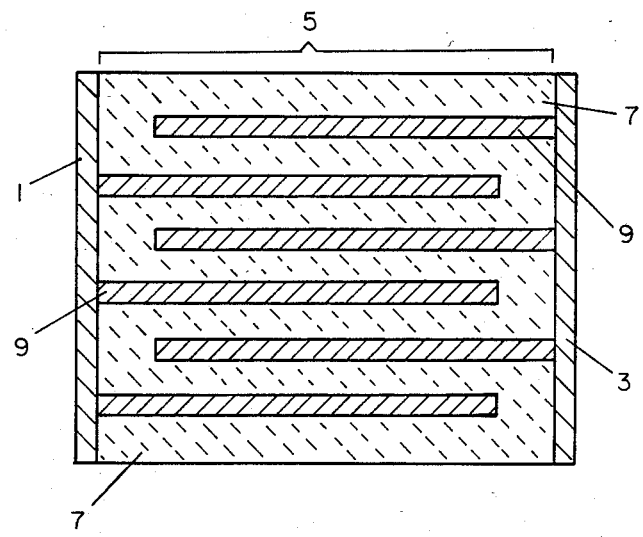
FIG. 7 is an elevational cross-sectional view of a multilayer capacitor.

The novel compositions may be employed in single layer capacitors or in a multilayer capacitor structure. FIG. 7 shows a typical multilayer capacitor structure. This capacitor comprises electrodes 1 and 3 which contact opposite sides of structure 5. The structure 5 comprises a plurality of ceramic layers 7 which are interleaved with metal layers 9. The metal layers 9 are alternately connected to the electrodes 1 and 3, respectively. Layer 7 consists essentially of the novel ceramic compositions set forth herein.

What is claimed is:

1. A ceramic capacitor comprising a plurality of spaced electrodes and a dielectric material therebetween, said dielectric material having a Q of at least about 500 at 1 MHz, a dielectric constant of from about 100 to 150 at temperatures of from $-55°$ to $125°$ C., a pyrochlore crystal structure which is represented by the formula $$(1-y)Pb(Zn_xNb_{1-x})O_{3.5-1.5x} \cdot yPbTiO_3$$

wherein x is from 0.3 to 0.4 and y is from 0 to less than 0.1.

2. The ceramic capacitor recited in claim 1 wherein the dielectric was sintered at a temperature of about $980°$ C.$\pm 20°$ C.

3. The ceramic capacitor recited in claim 1 wherein y is zero.

4. The ceramic capacitor recited in claim 1 wherein y is from 0.02 to 0.05.

5. The ceramic capacitor recited in claim 1 which is in the form of a sintered multilayer capacitor.

6. A dielectric material represented by the formula $$(1-y)Pb(Zn_xNb_{1-x})O_{3.5-1.5x} \cdot yPbTiO_3$$

wherein x is from 0.3 to 0.4 and y is from 0 to less than 0.1.

7. The dielectric material recited in claim 6 prepared by sintering at $980°$ C.$\pm 20°$ C.

8. The dielectric material as recited in claim 6 wherein y is zero.

9. The dielectric material as recited in claim 6 wherein y is from 0.02 to 0.05.

10. The dielectric material recited in claim 6 wherein y is from 0 to 0.05.

11. The dielectric material recited in claim 10 prepared by sintering at $980°$ C.$\pm 20°$ C.

12. A ceramic capacitor comprising a plurality of spaced electrodes and a dielectric material therebetween, said dielectric material having a Q of at least about 500 at 1 MHz, a dielectric constant of from about 100 to 150 at temperatures of from $-55°$ to $125°$ C., a pyrochlore crystal structure which is represented by the formula $$(1-y)Pb(Zn_xNb_{1-x})O_{3.5-1.5x} \cdot yPbTiO_3$$

wherein x is from 0.3 to 0.4 and y is from 0 to 0.05.

13. The ceramic capacitor recited in claim 12 wherein the dielectric was sintered at a temperature of about $980°$ C.$\pm 20°$ C.

14. The ceramic capacitor recited in claim 12 which is in the form of a sintered multilayer capacitor.

15. A ceramic capacitor comprising a plurality of spaced electrodes and a dielectric material therebetween, said dielectric material represented by the formula $$(1-y)Pb(Zn_xNb_{1-x})O_{3.5-1.5x} \cdot yPbTiO_3$$

wherein x is from 0.3 to 0.4 and y is from 0 to less than 0.1.

* * * * *